United States Patent [19]

Videlock et al.

[11] Patent Number: 5,179,555
[45] Date of Patent: Jan. 12, 1993

[54] HIGH SPEED DATA COMPRESSION AND TRANSMISSION FOR WIDE AREA NETWORK CONNECTIONS IN LAN/BRIDGING APPLICATIONS

[75] Inventors: Gary Videlock, Foxborough; Mark J. Freitas, East Walpole; Philip P. Gailinas, Whitinsville, all of Mass.

[73] Assignee: Microcom Systems, Inc., Wilmington, Del.

[21] Appl. No.: 824,732

[22] Filed: Jan. 21, 1992

Related U.S. Application Data

[63] Continuation of Ser. No. 580,657, Sep. 11, 1990, abandoned.

[51] Int. Cl.⁵ .............................................. H04J 3/02
[52] U.S. Cl. ................................. 370/85.13; 370/109
[58] Field of Search ............... 370/109, 85.13, 85.14, 370/85.5, 82

[56] References Cited

U.S. PATENT DOCUMENTS

| | | | |
|---|---|---|---|
| 4,679,191 | 7/1987 | Nelson et al. | 370/118 |
| 4,700,341 | 10/1987 | Huong | 370/82 |
| 4,823,342 | 4/1989 | Moute et al. | 370/109 |
| 4,901,312 | 2/1990 | Hui et al. | 370/85.12 |
| 4,922,503 | 5/1990 | Leone | 370/85.12 |

Primary Examiner—Douglas W. Olms
Assistant Examiner—T. Samuel
Attorney, Agent, or Firm—Schiller & Kusmer

[57] ABSTRACT

A bridge/router for use in bridging and routing data among one or more local area networks and a wide area network is disclosed. The bridge/router utilizes a data compressor adapted to compress data in frames adding an end of compression marker after each frame. The bridge/router provides data transmission speeds as fast as 2.048 Mbps and includes means for inhibiting the end of compression marker, while generating a data structure with each frame which is compressed with the frame of data. The data structure includes information representing the number of bytes of raw data in the corresponding frame so that on decompression the decompresser knows the number of bytes to provide in the resulting frame of decompressed data, thus avoiding the need for the end of compression marker. By inhibiting the marker compression is performed with greater efficiency.

16 Claims, 4 Drawing Sheets

HIGH SPEED DATA COMPRESSION AND TRANSMISSION FOR WIDE AREA NETWORK CONNECTIONS IN LAN/BRIDGING APPLICATIONS

This is a continuation of copending application Ser. No. 07/580,657 filed on Sep. 11, 1990, now abandoned.

The present invention relates generally to systems for providing high speed transmission of data; and more specifically to systems for improving the transmission of high speed, compressed data for wide area network connections linking local area networks.

BACKGROUND OF THE INVENTION

With the tremendous growth of data processing, local area networks and wide area networks have evolved as a way to permit digital communications among various devices, such as server devices for one or more data terminals (DTEs), computers, etc. As illustrated in FIG. 1, local area networks (LANs) 10 utilize a medium 12 to interconnect any number of nodes 14, the latter being a term used to represent the various devices digitally connected together through the medium 12. While the nodes 14 can represent the same or different devices, all of the nodes 14 communicate via the LAN medium 12 in accordance with a packet-type protocol with data therefore being transmitted in individual packets. Many protocols have been developed, the most notable are the Ethernet (IEEE 802.3 10base2, 10base5, or 10baseT) type or the Token Ring (IEEE 802.5 4Mbps or 16Mbps) type.

Occasionally, it is necessary or desirable for nodes 14 to communicate with other nodes not directly connected to the LAN medium 12. One system which has been developed to accomplish this task is the wide area network (WAN) 20 which utilizes a bridge/router 16 between it and each of the local area networks 10 to which it is connected. The bridge/router 16 is placed between the WAN 20 and the LAN via a digital link 18. Data is usually compressed in each remote bridge/router 16 before it is placed on the digital link 18 and processed by the WAN, and decompressed by the bridge/router 16 when compressed data is received over the digital link 12 from the WAN 20.

More specifically, as shown in FIG. 2, generally data from the LAN medium 12 is translated through a Media Access Unit (MAU) 22 to a form appropriate for data and clock recovery by the LAN interface 24 in the remote bridge/router 16. The data is transmitted in packets. If the packet of information from the LAN interface 24 is to be passed over the WAN link 18 to a remotely attached companion bridge/router, then it will be placed in shared memory and made available to the WAN interface 28 through the host processor platform 26. The host processor platform 26 of the typical currently available bridge/routers includes at least one data processor for performing the data compression or decompression and a microprocessor containing the necessary programs for compressing or decompressing data. Data compression enables more data to be transmitted through the data link 18 at a particular rate of transmission than uncompressed or raw data at its clocked data rate. The decompression of the data is typically performed in a complementary fashion from the compression technique so that the decompressed data should be identical to the initial raw data. One standard bridge/router is the MLB 6000 manufactured and sold by Microcom, Inc., of Norwood, Mass., the present assignee. The latter bridge/router is very effective in accomplishing its tasks. However, the Microcom bridge/router, which utilizes a high speed microprocessor incorporating software based compression and decompression programs, is only capable of compressing data which is transmitted at a rate of 64 Kbps or less. Should data be transmitted into the bridge/router at a greater rate, the device is adapted to disable the compression function and transmit the raw data at its uncompressed rate in order to prevent loss of data. Accordingly, the main advantage of compressing data, increasing the throughput of the data link, is lost at these higher speeds.

A second technique of compressing data is the use of an external data compression unit, such as the Datamizer, sold by the Symplex Inc., of Ann Arbor, Mich. However, this device is also rate limited at 256 Kbps. Until recently the rate limits of these devices were not significant since most LAN systems were remotely connected at transmission rates of 64 Kbps or less. However, devices such as T1 circuits and CEPT circuits which can provide data at rates much faster have become more inexpensive and accordingly more widely used. T1 circuits provide raw data at a rate up to 1.544 Mbps, while the CEPT circuits provide raw data at a rate of 2.048 Mbps.

OBJECTS AND SUMMARY OF THE INVENTION

Accordingly, it is an object of the present invention to provide a router/bridge which substantially overcomes the above-noted problems.

Another object of the present invention is to provide a router/bridge which compresses data at rates greater than 64 Kbps.

And another object of the present invention is to provide a router/bridge which compresses data at rates as high as 2.048 Mbps.

These and other objects are achieved by an improved router/bridge for use in bridging and routing data among one or more local area networks and a wide area network. The bridge/router utilizes a data compressor adapted to compress data in frames adding an end of compression marker after each frame. The bridge/router provides data transmission speeds as fast as 2.048 Mbps and includes means for inhibiting the end of compression marker, while generating a data structure with each frame which is compressed with the frame of data. The data structure includes information representing the number of bytes of raw data in the corresponding frame so that on decompression the decompresser knows the number of bytes to provide in the resulting frame of decompressed data. This will avoid the need for the end of compression marker. By inhibiting the end of compression marker, compression is performed more efficiently.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

GENERAL DESCRIPTION OF THE DRAWINGS

For a fuller understanding of the nature and objects of the present invention, reference should be had to the following detailed description taken in connection with the accompanying drawings, wherein.

DETAILED DESCRIPTION OF THE DRAWINGS

Figure 1:
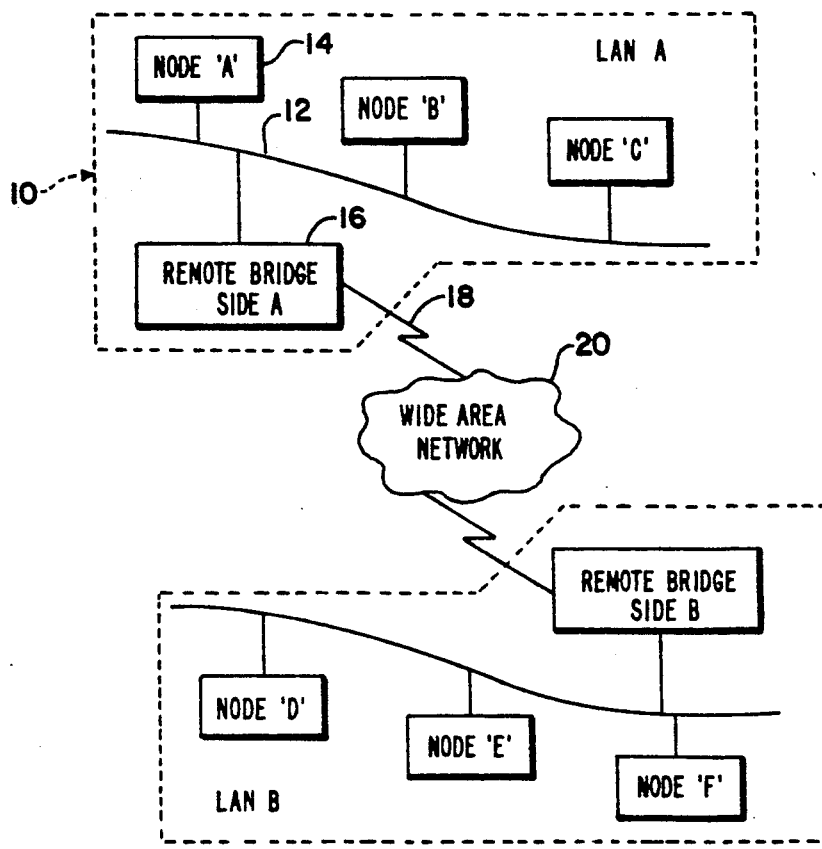
FIG. 1 is a block diagram showing the basic elements of local area networks coupled together with a wide area network.

In the drawings the same numerals are used to designate the same or like parts.

Figure 3:
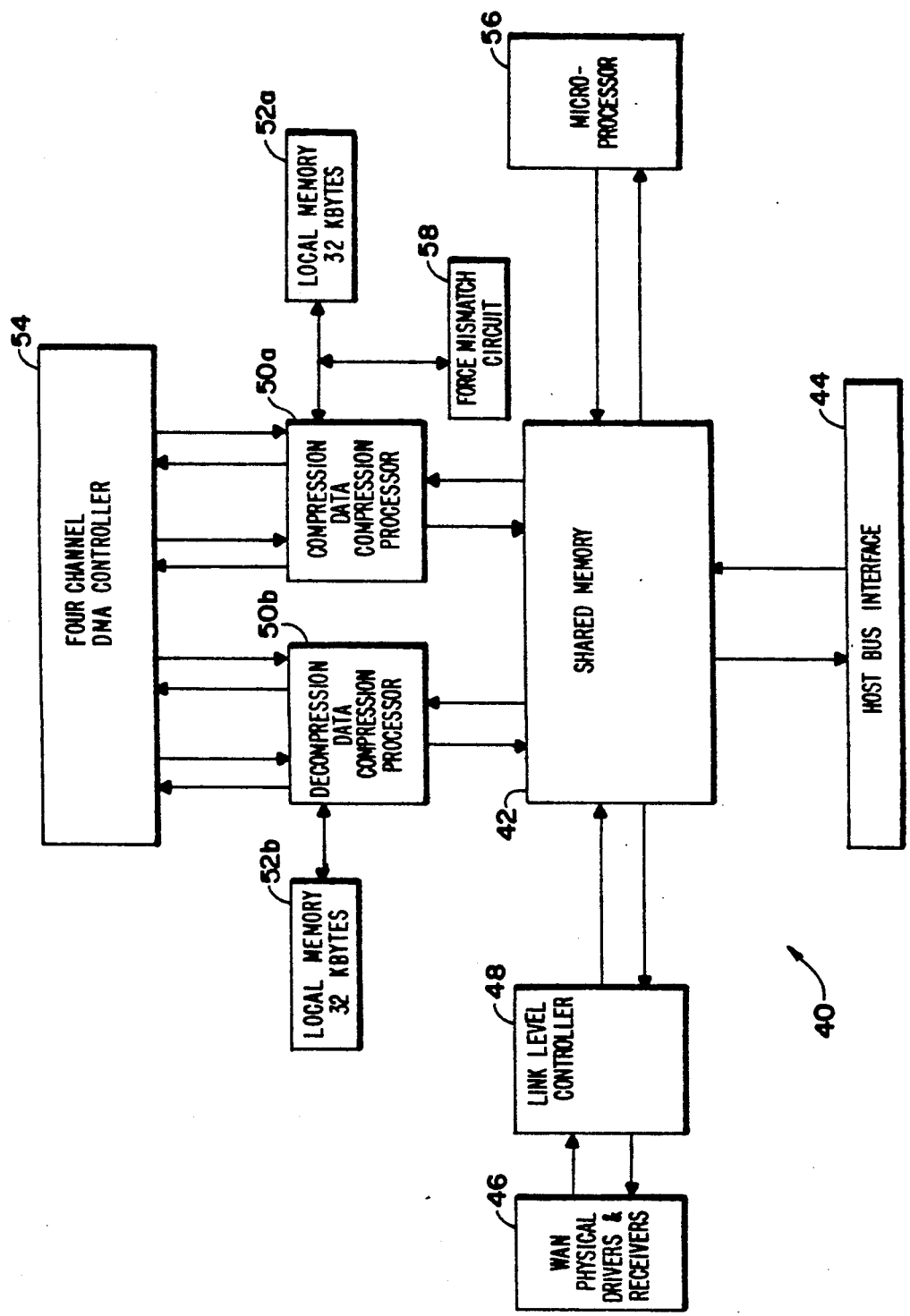
FIG. 3 is a block diagram of the preferred embodiment of the bridge/router system of the present invention.

Referring to FIG. 3, the preferred bridge/router system 40 of the present invention comprises a shared memory 42 for temporarily storing data so that data can be transferred among the various components of the system 40. The storage capacity of memory 42 clearly can vary depending upon the design of the system, with the memory of the preferred system having 128 Kbytes of memory based on space requirements. A host bus interface 44 is used to connect the system 40 to the medium 12, While the WAN physical drivers and receivers 46 transmit data to and receive data from the data link 18. The interface 44 and the drivers and receivers 46 will depend upon the LANs 10 and WAN 20 with which the system is used. A link level controller (LLC) 48 of each system insures that correct compressed data is reliably delivered from the transmitting bridge/router through the WAN to the receiving bridge/router so that the compression tables of the transmitting bridge/router remain synchronous with the decompression tables of the receiving bridge/router.

In the preferred embodiment the link level controller 48 is a chip manufactured and sold as the 5025 by SGS/Thomson of Carrollton, Tex. Such LLCs are designed to work among themselves though a WAN with a protocol so as to insure that each packet of information is reliably delivered. Typically, the transmitting packet will not be released by the transmitting controller until it receives acknowledgment 'rom the receiving controller that the data packet has been reliably delivered. Each LLC 48 functions as a parallel to serial converter so that data within the system 40 is treated in parallel while data transmitted on the data link 18 is transmitted serially.

Microprocessor 56 and data compression processors (DCP) 50a and 50b also are provided. Microprocessor 56 is connected to memory 42 and provides the instructions for operating the system 40. The latter is preferably a 68000 sold by Motorola although other microprocessors can be used.

The processors 50a and 50b each are preferably the 9703 chip manufactured by STAC, Inc. of Carlsbad, Calif. The latter are preferred since they operate at speeds up to 2.048 Mbps. One of the processors, processor 50a, is connected and configured to compress data received from storage 42, while the processor 50b is connected and configured to decompress data received from storage 42 so that full duplex operation can be carried out. The DCPs 50a and 50b are respectively programmed with well known compression and decompression algorithms and connected to work with a DMA controller (described hereinafter) to carryout the compression and decompression operations. The nature of the LAN connection is that it will remain static so that processor 50a will always be configured for compression and processor 50b will always be configured for decompression. Each processor 50a and 50b includes its own local memory 52a and 52b for respectively storing the compression and decompression tables of data during the corresponding compression and decompression operations. The STAC processors used in the preferred embodiment were designed to compress data prior to transmitting data to, or decompress compressed data received from a streaming tape drive medium. As such the STAC processors possess certain disadvantages in their use in data communication applications such as the present system 40.

For one, the processors, while having access to memory 42, do not have their own addressing function and therefore are not sufficiently intelligent enough to transmit data to or receive data from the memory 42. Accordingly, a dedicated direct memory access (DMA) controller 54 is provided for carrying out this addressing function. In the preferred system 40 the DMA controller 54 is the 68450 chip manufactured by Motorola Corporation of Schaumberg, Ill. which is a four channel device, two channels for use with the DCP 50a and two for use with the DCP 50b. As is well known the dedicated controller provides maximum speed efficiency. In addition the DMA controller includes counters which are useful in carrying out the operation of the system 40. A raw data counter is adapted to count raw data transmitted into the compression DCP 50a, while a compressed data counter is adapted to decrement in response to compressed data being generated at the output of the DCP 50a. Similarly, a compressed data counter is adapted to count data transmitted into the decompression DCP 50b, while a decompressed data counter is adapted to decrement in response decompressed data being generated at the output of the DCP 50b.

In addition the STAC chip is designed to compress data presented in large streams, wherein an "end of compression" marker is placed at the end of each stream during the compression operation. The marker can then be sensed by the receiving side of the DCP on playback from the tape as in indication of the end of the stream when decompressing the compressed data. The placement of the "end of compression " marker at the end of each stream of compressed data results in the clearing of the tables in corresponding local memory of the DCP and the resetting of buffers in the DCP. While such an arrangement is fine for tape drive applications, using the end of compression marker when transmitting large streams of data at a time to a WAN receiver is not desirable, since the latter will wait the entire transmission of data before retransmitting it to the receiving LAN. Accordingly, in order to reduce this latency effect, it is desirable to pipeline the compressed data in small amounts in order to provide a smoother data flow through the system. Specifically, the system 40 is designed to transmit the data in small encapsulate frames of data, each frame preferably representing 128 bytes or less of raw data. However, using the STAC chip, as commercially available, to compress these small frames of data would result in an end of compression marker being provided after each frame of data which is undesirable since it results in inefficient compression because of a lack of cumulative historical data.

Accordingly, the preferred system 40 also comprises force mismatch circuit 58 connected to communicate with the compression DCP 50a and its associated local memory 52a. In the preferred system the circuit is a programmable logic device (PLD) of the type known as a "p16r4" and is constructed to provide the inputs and outputs and to carry out the logic equations in the following listing, wherein the PLD language is CUPL, a registered trademark of the Logical Devices Incorporated of Fort Lauderdale, Fla.:

| | |
|---|---|
| /** Inputs **/ | |
| Pin 1 = clk; | /* clock generated by connecting pin 19 to pin 1 of this PLD */ |
| Pin 2 = !cwe; | /* connected to WE signal from DCP to its local memory chip */ |
| Pin 3 = !coe; | /* intercepted OE signal between DCP and its local memory chip */ |
| Pin 4 = force; | /* ForceMismatch signal controlled by microprocessor */ |
| Pin 5 = a14; | /* connected to A14 signal from DCP to its local memory chip */ |
| Pin 6 = a13; | /* connected to A13 signal from DCP to its local memory chip */ |
| Pin 7 = a0; | /* connected to A0 signal from DCP to its local memory chip */ |
| Pin 8 = c7in; | /* connected to C7 signal from DCP to its local memory chip */ |
| Pin 9 = c6in; | /* connected to C6 signal from DCP to its local memory chip */ |
| /** Outputs **/ | |
| Pin 12 = !oeout; | /* connected to this PLD's register OE(pin 11) */ |
| Pin 13 = delay; | |
| Pin 14 = c6out; | /* connected to C6 signal from DCP to its local memory chip */ |
| Pin 15 = c7out; | /* connected to C7 signal from DCP to its local memory chip */ |
| Pin 18 = !ramoe; | /* intercepted OE signal to DCP local memory chip */ |
| Pin 19 = clkout; | /* connected to this PLD's clock input (pin 1) */ |
| /** Equations **/ | |
| clockout = delay; | |
| delay = cwe & !a14 & !a13 & a0; | |
| oeout = coe & force & !a14 & !a13 & a0; | |
| ramoe = coe & !(force & !a14 & !a13 & a0); | |
| c6out.d = c6in; | |
| c7out.d = !c7in; /* when enabled this is what fools the DCP */ | |

The circuit 58 is designed to fool the DCP 50a so that when the circuit 58 is set the DCP will believe it has not seen the next character at its input so that it will flush its compressed data output buffer and place the next character in the compressed data output stream as raw data without compressing that raw data. Additionally, microprocessor 56 and circuit 58 are used to generate information representing a data structure, with the compressed data representing the frame of raw data. The data structure contains information as to the number of bytes of information of the corresponding frame so that when the compressed data is transmitted and received, the DCP 50b of the receiving system 40 will know how many bytes are contained in the frame.

Figure 2:
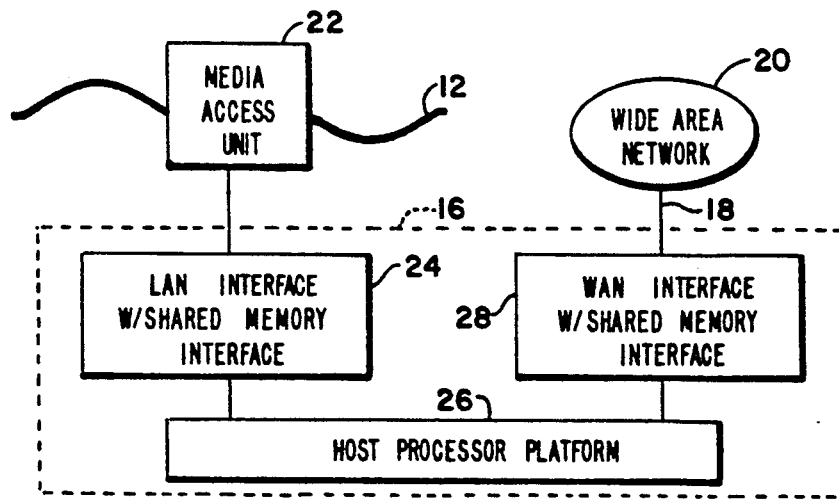
FIG. 2 is a block diagram showing the basic elements of a bridge/router used to couple each local area network to the wide area network.
Figure 6:
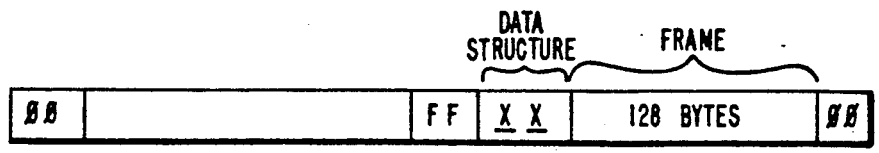
FIG. 6 is a schematic representation of the signal format provided in accordance with the present invention.

The foregoing will be more evident from a detailed description of the operation of the system 40. Depending upon the LAN with which the system 40 is used, the size of a packet of data transmitted on the medium depends on the packet format used. For example, Ethernet LAN packets can contain as many as 1517 bytes, while a token ring packet can be as small as 4 or 5 bytes and as large as 18,000 bytes. The system 40 is preferably used with a LAN interface, indicated at 24 in FIG. 2, which is adapted to divide each packet into 128 byte frames or less. Thus, where the packet contains less than or is equal to 128 bytes, one frame containing the number of bytes of the packet will be generated by the interface 28. Should the packet contain more than 128 bytes, the packet will be divided into two or more frames and a frame will be generated for each 128 byte of the packet until a remainder of 128 bytes or less is left which will be generated as the last frame of the packet. Thus, a frame of data received by the system 40 for compression may contain data representative of the beginning, middle or end of a packet, or may contain the entire packet. It will be apparent however, that the actual data content of each frame as it relates to the original packet will be irrelevant when compressing and sending data from one system 40 to another. Thus, as shown in FIG. 6, a frame of data contains a maximum of 128 bytes of data. In addition, the LAN provides a header prior to the frame of data. The header and frame data are transferred from the drivers and receivers 46, through the link level controller 48 and into the shared memory 42. The header contains a data structure, indicated by the notation XX including information indicating the frame size (i.e., the actual number of bytes contained in the frame).

Figure 4:
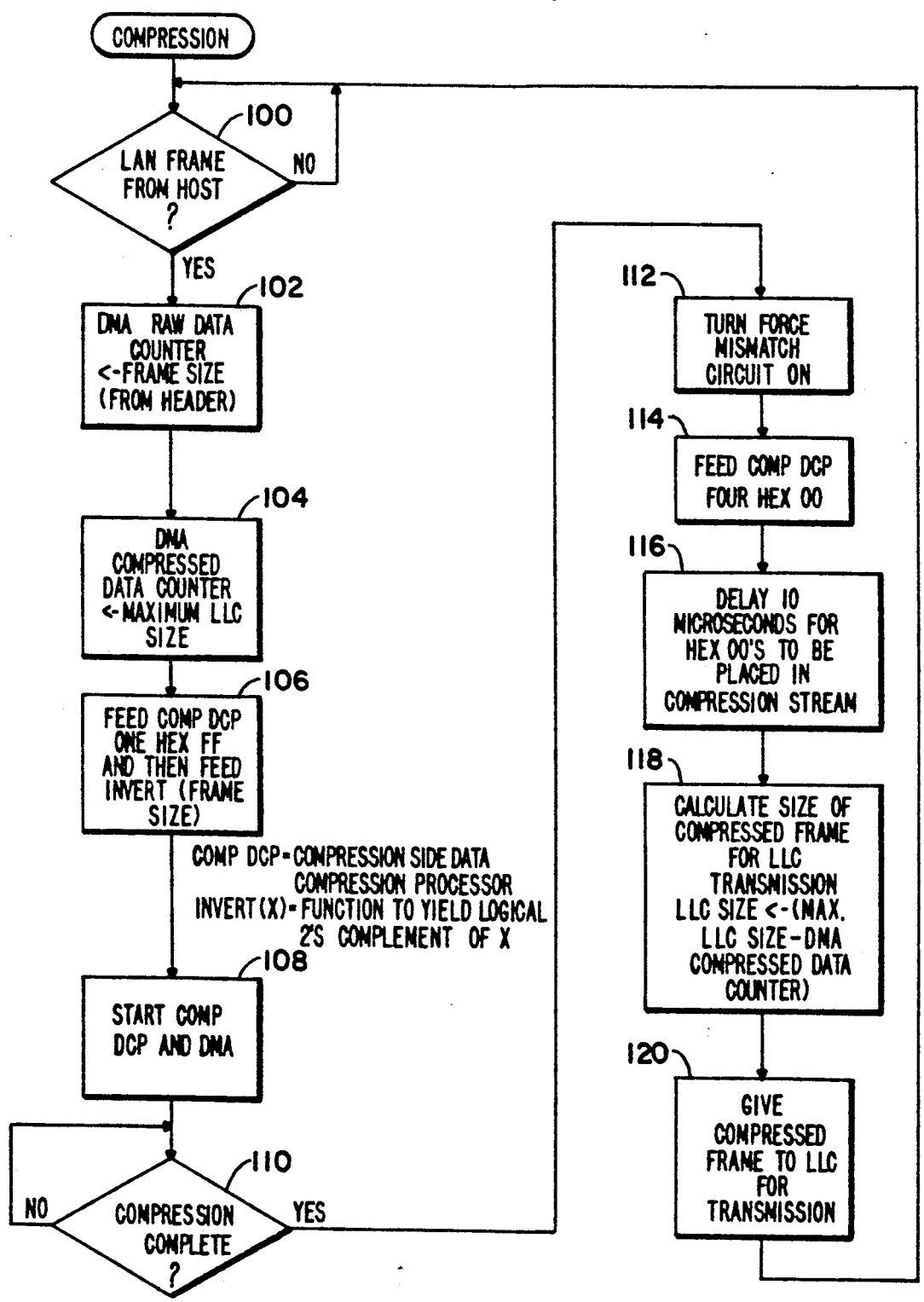
FIG. 4 is a flow chart of the operation of the system of FIG. 3 when data is compressed.

Referring to FIG. 4, in operation when data is being compressed by the system 40, each header and frame of data are provided to the host bus interface as indicated at step 100. The header and frame data are entered into the memory 42. The frame size is then read by the microprocessor 56 into the DMA controller 54. Specifically, the frame size is entered into the raw data counter in the DMA controller 54, as indicated at step 102. As indicated at step 104, the compressed data output counter is set with a number which is greater than or equal to the total maximum number of compressed bytes that can be provided from a frame of raw data. The total maximum number will depend on the compression ratio. For example, for 2:1 compression, the compressed data output will be 64 bytes of compressed data representative of a 128 byte frame, while a 4:1 compression ratio would provide 32 bytes of compressed data for a 128 byte frame.

As indicated at step 106, the microprocessor 56 then feeds the DCP 50a an eight bit reference signal from microprocessor 56 represented by the hex number FF, while the information representing the number of bytes of raw data is inverted and fed into the DCP 50a. The latter is represented by the hex number XX (where the original number is represented by the hex number XX). Using the first address provided to the DMA controller, the raw data contained in memory 42 is next read into the DCP 50a so that the entire FFXX[frame data] can now be compressed in accordance with the compression algorithms contained in the DCP 50a, as seen at step 108. Specific algorithms for compressing data are known and are not described in detail herein.

The compression of the data continues as indicated by loop 110 until the compression of the FFXX[frame data] is complete and read into the memory 40. As each pair of data bytes of compressed data (representing a word of data in this particular configuration) is read out of the DCP 50a into memory 40, the DMA compressed data counter is decremented by one. When the compression of the FFXX[frame data] is completed the counter will contain a number which when subtracted from the original count in the counter will indicate the number of compressed words that are to be transmitted to the WAN. Once the compression of data is completed the microprocessor 56 then turns on the force mismatch circuit 58 as indicated at step 112. As indicated by step 114, circuit 58 forces the DCP 50a to see the next four pieces of data (four nulls each represented by the hex number 00) (each an eight bit signal containing all zeros) provided by the microprocessor 56, as data that it should not compress based upon the compression algorithm. Accordingly, the four pieces of data will not be compressed nor entered into the compression tables contained in the local memory 52a, but instead will be placed as raw data into the compressed data stream being fed into the memory 40.

As indicated at step 116 a delay of ten microseconds is provided to accommodate the four hex 00's to be placed in the compression stream.

At step 118 the size of the actual compressed FFXX[frame data] is next calculated by reading the final number in the DMA compressed data counter and subtracting this final number from the original count. The resulting number is provided to the link level controller 48 so that the latter knows the number of bytes to transmit to the WAN. The compressed data is then transferred from memory 40 into the link level controller 48 so that it can be transferred to the WAN through the drivers 46.

Figure 5:
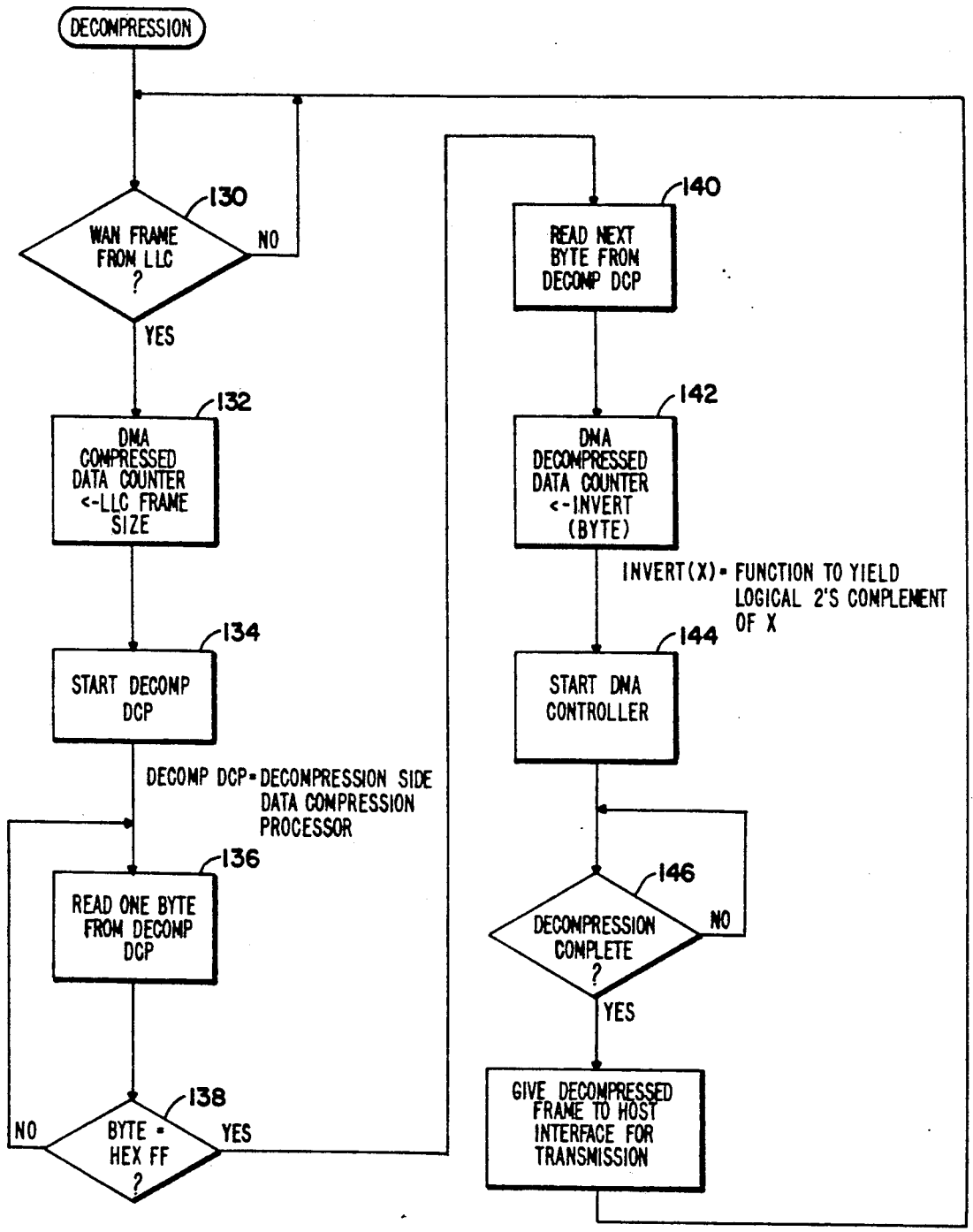
FIG. 5 is a flow chart of the operation of the system of FIG. 3 when data is decompressed.

As shown in FIG. 5 the decompression of data can now take place. The system 40 which is to receive the compressed data inquires at loop 130 whether data is present at the shared memory 42 being received from the link level controller 48. If the inquiry is yes, the process proceeds to step 132 with the DMA compressed data counter associated with the DCP 50b being set to the number of bytes received from the LLc 48. The decompression DCP 50b is then enabled by the microprocessor 56 at step 134. The data received from the LLC is read into memory 42 and each byte is read from memory 42 into DCP 50b as indicated at step 136. At step 136 each byte is read from the DCP 50b by the microprocessor to see if it is the FF type indicating the beginning of a header and frame data as queried at step 138. If the byte is not FF, the loop repeats steps 136 and 138. Once the byte FF is detected the next byte is read from the decompression DCP 50b at step 140. This byte will be the XX byte which contains information about the size of the frame. At step 142, it is inverted and entered into the DMA decompressed data counter which is used to count the number of bytes provided at the output of the DCP 50b. The decompressed data counter will now contain the number of bytes contained in the original frame and measure the number as it is provided at the output of the DCP 50b. The DMA controller can now be enabled to move the data out of the decompression DCP 50b buffer as indicated at step 144. The decompression continues as indicated at step 146 with compressed data being read from the memory 40 into the DCP 50b and a stream of decompressed data being provided at the output of the DCP 50b. As the stream of decompressed data exits the DCP 50b and is placed in memory 40 the decompressed data counter is decremented. When the counter decrements to zero the counter indicates the end of the stream of decompressed data which should be identical to the original raw data of the frame. Once the microprocessor is informed that all of the data representing the data frame has been decompressed and entered into the memory 40, the decompressed frame of data is given by the microprocessor to the host bus interface 44 for transmission to the LAN as indicated at step 148.

The foregoing system 40 thus provides an improved bridge/router for use in LANs through a WAN. It is capable of operating at data rates of 2.048 Mbps. By inhibiting the end of the compression marker otherwise provided by the compression DCP 50a, the compression tables will not be cleared and the buffers will not be reset. This provides greater continuity between compressed frames of a packet providing greater efficiency in the compression operation.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A data communications system of the type for bridging and routing data among one or more local area networks and a wide area network, said system comprising:
   means for separating said data transmitted on a local area network into one or more frames of data of a predetermined maximum byte length;
   means for compressing each frame of data in accordance with a compression technique dependent on cumulative historical data and for transmitting said compressed data to said wide area network, said means for compressing each of said frames including means for providing an end of compression marker at the end of each frame of compressed data; and
   means for inhibiting said end of compression marker so as to preserve the cumulative historical data during the compression of said data.

2. A system according to claim 1, further including means for providing a data structure with each of said frames of data such that said data structure is compressed with the corresponding frame of data.

3. A system according to claim 2, wherein said means for providing said data structure provides said data structure so that said data structure includes information relating to the number of bytes in said frame.

4. A system according to claim 3, further including means for decompressing said compressed data structure and data received from said wide area network based on said number of bytes in said frame and for transmitting said decompressed data to said local area network.

5. A system according to claim 4, further including means for generating a reference signal prior to said data structure so as to indicate the beginning of said data structure.

6. A system according to claim 1, wherein said means for inhibiting said end of compression marker includes means for providing raw data to the end of each stream of said compressed frame of data.

7. A system according to claim 1, wherein said means for inhibiting said end of compression marker includes means for inhibiting said means for providing said end of compression marker.

8. A system according to claim 1, wherein said means for compressing each frame of data and for transmitting said compressed data to said wide area network includes a local area network interface.

9. A system according to claim 1, wherein said means for compressing each frame of data and for transmitting said compressed data to said wide area network includes means for determining the number of bytes of said compressed data resulting from the compression of each frame of data so that the proper number of bytes of compressed data corresponding to each frame of data can be transmitted over said wide area network.

10. A system according to claim 9, wherein said means for determining the number of bytes of said compressed data resulting from the compression of each said frame of data includes a compressed data output counter for counting the number of bytes of compressed data corresponding to each frame of data, and means, responsive to the count provided in said counter following the compression of each said frame of data, for transmitting the correct number of bytes of compressed data corresponding to each frame of data over said wide area network.

11. A system according to claim 10, further including means for setting said compressed data output counter with a number greater than or equal to the total maximum number of compressed bytes that can be provided from a compressed frame of said data and means for decrementing said counter in response to each byte of compressed data, and means for reading said compressed data output counter prior to transmitting compressed data corresponding to each frame of data over said wide area network.

12. A system according to claim 3, wherein said means for providing said data structure includes means for determining the number of bytes in each said frame of data, means for storing said number and means generating as a part of said data structure said number.

13. A system according to claim 3, wherein said means for providing said data structure includes counter means for counting the number of said bytes in each said frame of data, means for inverting the number in said counter means representative of the number of bytes in each said frame of data so as to provide an inverted count number, and means for providing said inverted number as a part of said data structure prior to compressing said data.

14. A system according to claim 1, further including means for decompressing said compressed data received from said wide area network.

15. A system according to claim 14, further including means for providing a data structure with each of said frames of data such that said data structure is compressed with the corresponding frame of data, said means for providing said data structure provides said data structure so that said data structure includes information relating to the number of bytes in said frame, and wherein said means for decompressing said compressed data includes means for decompressing said data structure, means for utilizing said information relating to the number of bytes in each said frame so that said system can determine the size of each of said frame of data provided by said decompression.

16. A system according to claim 15, wherein said means for utilizing said information relating to the number of bytes in said frame includes counter means for storing said information relating to the number of bytes in each said frame, means for decrementing said counter as said compressed data is decompressed, and means for indicating when said counter is at a state indicating that all of said compressed data has been decompressed.

* * * * *

UNITED STATES PATENT AND TRADEMARK OFFICE
CERTIFICATE OF CORRECTION

PATENT NO. : 5,179,555

DATED : January 12, 1993

INVENTOR(S) : Gary Videlock, Mark J. Freitas, Philip P. Gailinas

It is certified that error appears in the above-identified patent and that said Letters Patent is hereby corrected as shown below:

Claim 9, column 9, line 8, after "each", insert --said--.

Signed and Sealed this

Ninth Day of November, 1993

*Attest:*

BRUCE LEHMAN

*Attesting Officer*    Commissioner of Patents and Trademarks